United States Patent [19]

Brunold et al.

[11] 4,048,130

[45] Sept. 13, 1977

[54] PROCESS FOR THE PRODUCTION OF SELF-CROSS-LINKING LACQUERS

[75] Inventors: Marcel Brunold; Klaus Hering; Paul Wicht; Christian Vonlanthen, all of Fribourg; Jurg Kislig, Ostermundigen; Theodor Volker, Fribourg, all of Switzerland

[73] Assignee: Lonza Ltd., Gampel, Valais, Switzerland

[21] Appl. No.: 557,061

[22] Filed: Mar. 10, 1975

[30] Foreign Application Priority Data

Mar. 8, 1975 Switzerland .................... 3265/75

[51] Int. Cl.² ............................................ C08L 35/02
[52] U.S. Cl. .................. 260/29.6 NR; 260/29.4 UA; 260/29.6 TA; 260/27.6 SQ
[58] Field of Search ............... 260/29.4 UA, 29.6 NR, 260/29.6 TA, 29.6 SQ; 428/463, 461

[56] References Cited

U.S. PATENT DOCUMENTS

| | | | |
|---|---|---|---|
| 2,859,191 | 11/1958 | Turnbull | 260/29.6 SQ |
| 3,306,871 | 2/1967 | Miller | 260/29.6 TA |
| 3,714,106 | 1/1973 | Smith et al. | 260/29.6 TA |

FOREIGN PATENT DOCUMENTS

2,211,169  10/1972  Germany

*Primary Examiner*—M. J. Welsh
*Attorney, Agent, or Firm*—Virgil H. Marsh

[57] ABSTRACT

The process for preparing a lacquer utilizing an aqueous dispersion, the lacquer being pigmented or non-pigmented, being self-cross linking upon heat treatment and containing a binder consisting essentially of the following monomers:

a. 30 to 70 parts by weight of at least one monomer whose homopolymer has a theoretical glass temperature of less than 10° C., based on the total weight of the binder,
b. 30 to 70 parts by weight of at least one monomer whose homopolymer has a theoretical glass temperature of more than 30° C., based upon the total weight of the binder,
c. 0.5 and 5 parts by weight of at least one polymerizable acid and/or salt thereof, based upon the total weight of the binder,
d. 2 to 35 parts by weight of at least one reactive monomer, based upon the total weight of the binder, and
e. 0.5 to 35 parts by weight of at least one alkali or ammonium salt of a polymerizable sulfonic acid compound, based upon the total weight of the binder.

The process involves conducting the polymerization in an aqueous dispersion in a reaction vessel at a preselected temperature between 15° and 30° C. and at a starting pH of 3 to 4 in the presence of a redox system consisting of 0.005 to 0.5 percent by weight of at least one alkali and/or ammonium persulfate, based upon the total weight of the monomers, 0.001 to 0.5 percent by weight of ascorbic acid, based upon the total weight of the monomers, and 10 to 30 p.p.m. of at least one iron (II)-salt based upon the total weight of the monomers. No more than 30 percent of the monomers and the majority (at least 50 percent) of the persulfate are inserted into the reaction vessel before the polymerization step starts. After the polymerization step starts, the remaining amount of monomers are dosed into the reaction vessel concurrently and parallel with the iron (II)-salt and the ascorbic acid in such a manner that the preselected polymerization temperature remains almost constant.

34 Claims, No Drawings

PROCESS FOR THE PRODUCTION OF SELF-CROSS-LINKING LACQUERS

BACKGROUND OF THIS INVENTION

1. Field of This Invention

This invention relates to a process for the production of pigmented or nonpigmented self-cross-linking lacquers utilizing an aqueous dispersion.

2. Prior Art

The hitherto customary coatings for metals have been based on the use of a drying oil and of a fast drying lacquer base substance (such as, natural resins, a combination of natural and synthetic resins or of an alkyd resin modified with a urea, melamine or phenol formaldehyde resin) -such contains volatile organic solvents which frequently are flammable and which during the coating process develop harmful vapors. Because of this, special measures are needed for the recapture of the solvents themselves. Other proposed binders for coatings contain unsaturated polymer systems, such as butadiene-styrene lattices. However, this polymer type is imbued with the known disadvantages of becoming brittle and capable of discoloration upon progressive oxidation.

There has been a need for a long time for coating compounds which can be applied from aqueous media and consequently do not develop any undesirable flammable or toxic vapors, and which are self-cross-linking solely as a result of heat action.

Known aqueous systems are described in the U.S. Pat. Nos. 2,760,886, 2,918,391 and 3,033,811. These coating masses are not satisfactory since they are inclined to dry prematurely during application because they are not able to form a smooth surface film due to the formation of blisters during the heat treatment.

Heat hardenable coating compounds in the form of aqueous lattices are also known (see German published application No. 2,211,169). Such are produced in accordance with the customary emulsion polymerization process. The binders used in such are based on two compounds, one being an additional copolymer consisting of an aromatic monovinyl monomer, an ester of the acrylic or methacrylic acid, at least one olefinic unsaturated monomer with an amide or hydroxyl groups and one olefinically unsaturated monomer with a carboxyl group, and the other consisting of a water soluble urea-formaldehyde resin. The disadvantage of these coating compounds lies in the fact that they are not self-curing (self-cross linking) and thus a multiple of important characteristics and properties (such as, pigment compatability, distribution of the pigments, adhesive capacity, luster, resistance to water and solvents, resistance to heat and atmospheric corrosion) are impaired through the addition of a considerable amount of a second cross-linking component.

BROAD DESCRIPTION OF THIS INVENTION

An object of this invention is to provide a process for producing self-cross-linking lacquers utilizing an aqueous dispersion. Another object of this invention is to provide self-cross-linking lacquers which, once self-cross-linked by heat treatment have good resistance to heat and atmospheric corrosion, high chemical resistance, and which result in glossy coatings which are both hard and tough. Other objects and advantages of this invention are set out herein or are obvious to those ordinarily skilled in the art.

Such objects and advantages are achieved by this invention.

This invention involves a process for preparing a lacquer utilizing an aqueous dispersion, the lacquer being pigmented or non-pigmented, being self-cross linking upon heat treatment and containing a binder consisting essentially of the following monomers;

a. 30 to 70 parts by weight of at least one monomer whose homopolymer has a theoretical glass temperature of less than 10° C., based on the total weight of the binder, b. 30 to 70 parts by weight of at least one monomer whose homopolymer has a theoretical glass temperature of more than 30° C., based upon the total weight of the binder, c. 0.5 to 5 parts by weight of at least one polymerizable acid and/or salt thereof, based upon the total weight of the binder, d. 2 to 35 parts by weight of at least one reactive monomer, based upon the total weight of the binder, and e. 0.5 to 35 parts by weight of at least one alkali or ammonium salt of a polymerizable sulfonic acid, based upon the total weight of the binder. The process includes conducting the polymerization in an aqueous dispersion in a reaction vessel at a preselected temperature between 15° and 30° C. and at a starting pH of 3 to 4 in the presence of a redox system consisting of 0.005 to 0.5 percent by weight of at least one alkali and/or ammonium persulfate, based upon the total weight of the monomers, 0.001 to 0.5 percent by weight of ascorbic acid, based upon the total weight of the monomers, and 10 to 30 p.p.m. of at least one iron (II)-salt, based upon the total weight of the monomers. No more than 30 percent of the monomers and the majority of the persulfate is inserted into the reaction vessel before the polymerization step starts. After the polymerization step starts, the remaining amount of monomers is dosed concurrently and parallel into the reaction vessel with the iron (II)-salt and the ascorbic acid in such a manner that the preselected polymerization temperature remains almost constant.

DETAILED DESCRIPTION OF THE INVENTION

The polymerization temperature can be between 15° and 30° C. and is preferably between 20° and 23° C. The control of the polymerization temperature is preferably carried out essentially automatically by synchronizing the dosing in of the iron (II)-salt and of the ascorbic acid as well as of the rest of the monomers with the outside cooling so as to maintain a preselected constant polymerization temperature which will not deviate more than ± 1° C. during the polymerization. Herein, an almost constant polymerization temperature means a deviation no larger than about ± 2° C. during polymerization. Preferably the polymerization temperature does not deviate more than ± 1° C. during polymerization. A constant polymerization temperature can be obtained by dosing in the remaining amount of the monomers concurrently and parallel with the iron (II)-salt and the ascorbic acid at such a rate the preselected polymerization temperature remains constant. A constant polymerization temperature (± 1° C.) can be obtained by controlling the polymerization rate by controlling the amount and speed of dosing in the reducing initiator components.

The preferred alkali or ammonium persulfate is potassium persulfate and other examples of the persulfate are sodium persulfate, ammonium persulfate, lithium persulfate, rubidium persulfate and cesium persulfate. Mixtures thereof can be used. 0.005 to 0.5 percent of weight, and preferably 0.05 to 0.2 percent by weight, of at least one alkali and/or ammonium persulfate, based upon the total weight of the monomers, is used. At least a majority (50 percent) of the alkali and/or ammonium persulfate is inserted into the reaction vessel before the polymerization step starts and the remainder is added in doses during or at the end of the polymerization reaction.

Ascorbic acid is used in an amount between 0.001 to 0.5 percent by weight, and preferably between 0.01 and 0.2 percent by weight, based upon the total weight of the monomers. The ascorbic acid is added to the reaction vessel together with the emulsifier and with the iron (II)-salt. The iron (II)-salt is used in an amount between 10 and 30 p.p.m., and preferably between 10 and 20 p.p.m., based upon the total weight of the monomers. The preferred iron (II)-salt is ferrous sulfate and other examples of the iron (II)-salt are ferrous acetate, ferrous chloride, ferrous chromite, ferrous bromide, ferrous fluoride, ferrous citrate, ferrous carbonate, ferrous iodide, ferrous formate, ferrous perchlorate, ferrous lactate, ferrous nitrate, ferrous oxalate, ferrous sulfate, and ferrous sulfide. Beside that, other iron compounds and complexes can also be used which under the given circumstances releases iron (II)-ions. Examples of such are iron (III)-sulfate, iron (II)-chloride, the iron salt of ethylenediaminetetraacetic acid or ferrocene. Any suitable emulsifier or emulsifiers can be used. The anionic wetting agents are the best emulsifiers, and preferably are used in a quantity between 0.05 to 5 percent by weight, based on the monomers. Suitable anionic emulsifiers are the alkyl sulfates, sulfates of alkyl and alkylarylpolyethoxy alkanols, alkyl sulfonates, and alkylarly sulfonates as well as esters of the sulfosuccinic acid with alkanols.

The starting pH is between 3 and 4, preferably is 3.5. The pH is adjusted, if necessary, to such by means on an organic acid, and preferably a polymerizable acid, such as acrylic acid, methacrylic acid, maleic acid, fumaric acid, etc. Any of the polymerizable (organic) acids listed below can be used. Examples of other organic acids are saturated (fatty) acids (having 1 to 20 carbon atoms, such as, acetic acid, myristic acid, formic acid, pentadecanoic acid, propionic acid, palmitic acid, butyric acid, margaric acid, valeric acid, stearic acid, caproic acid, nonadecanoic acid, enanthic acid, arachidic acid, caprylic acid, isobutyric acid, pelagonic acid, isovaleric acid, capric acid, trimethylacetic acid, undecanoic acid, isocaproic acid, lauric acid, dimethylethylacetic acid, tridecanoic acid, and 2-ethylhexanoic acid. During the polymerization the pH value can change without impairing the polymerization.

For special purposes, for examples, in order to reduce the baking temperature, 1 to 15 percent by weight, based on the aqueous polymerization dispersion, of a water soluble melamine and/or urea resin can be added to the dispersion after the polymerization.

30 to 70 parts by weight, and preferably 40 to 60 parts by weight, of the monomer whose homopolymer has a theoretical glass temperature of less than 10° C., based on the total weight of the binder, is used. Mixtures of such monomers can be used in a total amount within such ranges.

Example of monomers whose homopolymers have a theoretical glass temperature of less than 10° C. are: acrylic acid esters having 1 to 8 carbon atoms in the ester radical (group), such as, methyl acrylate, ethyl acrylate, propyl acrylate, heptyl acrylate, butyl acrylate, octyl acrylate, pentyl acrylate, isobutyl acrylate, hexyl acrylate, sec.-butyl acrylate, ethylhexyl acrylate, tert,-butyl acrylate, isopropyl acrylate, 2-methyl-1-butyl acrylate, dimethylpropyl acrylate, 3-methyl-1-butyl acrylate, 2-pentyl acrylate, 2-methyl-2-butyl-acrylate, 3-pentyl acrylate, 3-methyl-2-butyl acrylate, 2-ethyl-1-butyl acrylate, 2-methyl-1-pentyl acrylate, 3,3-dimethyl-1-butyl acrylate, 3-methyl-1-pentyl acrylate, 2,3-dimethyl-1 -butyl acrylate, 3-methyl-2-pentyl acrylate, 2,2-dimethyl-3-butyl acrylate, 4-methyl-2-pentyl acrylate, 2,3-dimethyl-2-butyl acrylate, 2-methyl-3-pentyl acrylate, 2,4-dimethyl-3 -pentyl acrylate, 3-methyl-2-pentyl acrylate, 2,4-dimethyl-1-pentyl acrylate, 3-methyl-3-pentyl acrylate, 2,3,3-trimethyl-2-butyl acrylate, 2-hexyl acrylate, 2,4,4-trimethyl-1-pentyl acrylate, 3-hexyl acrylate and 2-octyl acrylate, methacrylic acid esters having 6 to 18 carbon atoms in the ester radical, such as, hexyl methacrylate, octyl methacrylate, n-decyl methacrylate, n-tetradecyl methacrylate, heptyl methacrylate, pentadecyl methacrylate, nonyl methacrylate, hexadecyl methacrylate, undecyl methacrylate, heptadecyl methacrylate, dodecyl methacrylate, octadecyl methacrylate, tridecyl methacrylate, 2-ethyl-1-butyl methacrylate, 3-hexyl methacrylate, 2-methyl-1-pentyl methacrylate, 2-hexyl methacrylate, 3-methyl-1-pentyl methacrylate, 2,3,3-trimethyl-2-butyl methacrylate, 4-methyl-2-pentyl methacrylate, 3-methyl-2-pentyl methacrylate, 4-methyl-1-pentyl methacrylate, 2-methyl-2-pentyl methacrylate, 2-octyl methacrylate, 3-methyl-3-pentyl methacrylate, 2,3-dimethyl-1-butyl methacrylate, 3,3-dimethyl-1-butyl methacrylate, 2,3-dimethyl-2 -butyl methacrylate, 2,4-dimethyl-3-pentyl methacrylate, 2,4-dimethyl-1-pentyl methacrylate and 3-methyl-2-isopropyl-1butyl methacrylate, vinyl esters having 3 to 20 carbon atoms in the acid radical (preferably ones with a branched carbon chain), such as, vinyl propionate, vinyl butyrate, vinyl valerate, vinyl capronate, vinyl stearate, vinyl asobutyrate, vinyl versatate®, vinyl isobutyrate, vinyl 2-methylbutanoate, vinyl isovalerate, vinyl pivalate, vinyl 4-methypentanoate, vinyl isocapronate, vinyl 2-methylpentanoate, vinyl 2-ethylbutanoate, vinyl 3-methylpentanoate, vinyl 2,2-dimethylbutanoate, vinyl heptanoate, vinyl 3,3-dimethylbutanoate, vinyl octanoate, vinyl 2,3-dimethylbutanoate, vinyl nonanoate, vinyl 2-ethylhexanoate, vinyl decanoate, vinyl tetradecanoate, vinyl pentadecanoate, vinyl dodecanoate, vinyl palmitate, vinyl undecanoate, vinyl margarate, vinyl tridecanoate, vinyl nonadecanoate and vinyl arachidate; olefins having 2 to 10 carbon atoms, such as, ethylene, butylene, propylene, 2,3-dimethyl-1butene, 2-butene, 3,3-dimethyl-1-butene, 3-methyl-2-butene, 2,3-dimethyl-2-butene, 3-methyl-1-butene, 2-ethyl-3-methyl-1-butene, 2-methyl-1-butene, 2-methyl propene, 2-ethyl-1-butene, 1-pentene, 2-methyl-2 butene, 2-pentene, tetramethyl ethylene, 3-methyl-2-pentene, unsym-methylisopropylethylene, 2,3,4,4-tetramethyl-1-hexene, 3,4,5,5-tetramethyl-2 hexene, t-butylethylene, 3,4,5,5-tetramethyl-2-hexene, 2-ethyl-1-pentene, 3,5,5-trimethyl-2-heptene, 2-methyl-1-pentene, 2,3-dimethyl-1-pentene, 3-methyl-1-pentene, 2,4-dimethyl-1-pentene, 4-methyl-1-pentene, 3,3-dimethyl-1-pentene, 3-ethyl-2-pentene, 2,3-dimethyl-2-pentene, 2-methyl-2-pentene, 2,4-dimethyl-2-pentene, 3-methyl- 2-pentene, 3,4-dimethyl-2-pentene, 4-methyl-2-pentene, 4,4-dimethyl-2-pentene, 1-hexene, 2-hexene, 3-hexene, 2-methyl-1-hexene, 2,5-dimethyl-3-hexene, 3-methyl-1-hexene, 1-heptene, 4-methyl-1-hexene, 2-heptene, 5-methyl-1-hexene, 3-heptene, 2-methyl-2-hexene, 1-octene, 3-methyl-2-hexene, 4-methyl-2-hexene, 2,4,4-trimethyl-1-pentene, 5-methyl-2hexene 2,4,4-trimethyl-2-pentene, 2-methyl-3-hexene, 2,3,4-trimethyl-2-pentene, 2,2-dimethyl-3-hexene, 1-nonene, 3,3-dimethyl-4-hexene and 1-decene; diolefins (dienes) having 3 to 10 carbon atoms, such as, propadiene, 1,2-butadiene, 4-methyl-1,3-pentadiene, 1,3-butadiene, 2,3-pentadiene, 3-methyl-1,2-butadiene, 2,4-hexadiene, 2-methyl-1,3-butadiene, 1,2-pentadiene, 2,3-dimethyl-1,3-butadiene, 1,3-pentadiene, 2,5-dimethyl-hexadiene, 1,4-pentadiene, 2,6-dimethyl-heptadiene, 1,5-hexadiene, 2,4-heptadiene, 3,7-dimethyl-1,6-octadiene, 1,6-octadiene, 2,6-dimethyl-2,6-octadiene, 2,6-octadiene, 7-methyl-2,4-octadiene, 2,4-octadiene, 2,7-octadiene, 2,4-dimethyl-3-isopropyl-1,3-pentadiene, nonadiene, 1,3-decadiene and 2,3,3,4-tetramethyl-1,4-pentadiene; maleic acid esters having 4 to 18 carbon atoms in the ester radical, such as, butyl maleate, isobutyl maleate, pentyl maleate, tert.-butyl maleate, hexyl maleate, dimethylpropyl maleate, heptyl maleate, 2-methyl-2-butyl maleate, octyl maleate, 2,3-dimethyl-1-butyl maleate, decyl maleate, 2,2-dimethyl-2-butyl maleate, undecyl maleate, 2,3-dimethyl-2-butyl maleate, dodecyl maleate, octadecyl maleate, nonyl maleate, tridecyl maleate, heptadecyl maleate, tetradecyl maleate, pentadecyl maleate, hexadecyl maleate, 2-methyl-1-pentyl maleate, 2,4-dimethyl-3-pentyl maleate, 3-methyl-1-pentyl maleate, 2,4-dimethyl-1-pentyl maleate, 4-methyl-1-maleate, 2,3,3-trimethyl-2-butyl maleate, 3-methyl-2-pentyl maleate, 2-ethyl-1-hexyl maleate, 4-methyl-2-pentyl maleate, 2-octyl maleate, 2-methyl-1-pentyl maleate, 2,4,4-trimethyl-1-pentyl maleate, 3-methyl-3-pentyl maleate, 2,3,4-trimethyl-1pentyl maleate, 2-methyl-2-pentyl maleate, 2,3,4-trimethyl-2-pentyl maleate, 2-ethyl-1-butyl maleate, 3,3,4-trimethyl-1-pentyl maleate, and 3-methyl-2-isopropyl-1-butyl maleate; fumaric acid esters having 4to 18 carbon atoms in the ester radical, such as, butyl fumarate, 2-methyl-1-butyl fumarate, pentyl fumarate, 3-methyl-1-butyl fumarate, hexyl fumarate, 2-ethyl-1-hexyl fumarate, heptyl fumarate, nonyl fumarate undecyl fumarate, octyl fumarate, octadecyl fumarate, heptadecyl fumarate, decyl fumarate, pentadecyl fumarate, hexadecyl fumarate, dodecyl fumarate, tert.-butyl fumarate, 2-octyl fumarate, tridecyl fumarate, diethylpropyl fumarate, tetradecyl fumarate, 3-methyl-2-isopropyl-1-butyl fumarate, isobutyl fumarate, 2-methyl-1-pentyl fumarate, 2-3-dimethyl-1-butyl fumarate, 3-methyl-1-pentyl fumarate, 2,2-dimethyl-2-butyl fumarate, 2-ethyl-1-butyl fumarate, 2,3-dimethyl-2-butyl fumarate, 4-methyl-1-pentyl fumarate, 2,4-dimethyl-3-pentyl fumarate, 3-methyl-2-pentyl fumarate, 2,4-dimethyl-1-pentyl fumarate, 4-methyl-2-pentyl fumarate, 2-methyl-3-pentyl fumarate, 3-methyl-3-pentyl fumarate, 2-methyl-2-pentyl fumarate, 2,3,3-trimethyl-2-butyl fumarate, 2,4,4-trimethyl-1-pentyl fumarate, 2,3,4-trimethyl-1-pentyl fumarate, 3,3,4-trimethyl-1-pentyl fumarate and 2,3,4-trimethyl-2-pentyl fumarate.

30 to 70 parts by weight, and preferably 40 to 60 parts by weight, of the monomer whose homopolymer has a glass theoretical temperature of more than 30° C. (preferably 30° to 150° C.), based upon the total weight of the binder, is used. Mixtures of such monomers can be used in a total amount within such ranges. Examples of monomers whose homopolymers have a theoretical glass temperature of more than 30° C. are acrylonitrile, vinyl chloride, vinyl acetate, chloroacetic acid vinyl ester, trifluoroacetic acid vinyl ester, benzoic acid vinyl ester, styrene, α-methyl-styrene, vinyl toluene and methacrylate esters having 1 to 4 carbon atoms in the ester radical, such as, methyl methacrylate, ethylmethacrylate, propyl methacrylate, butyl methacrylate, ispropyl methacrylate and isobutyl methacrylate.

The glass temperatures represent an additional criterion and have been described by Flory in "Principles of Polymer Chemistry", pages 56 and 57, (1953), Cornell University Press. Although actual measurement of the glass transition temperature is preferred, it can also be calculated as described by Fox in Bull. Am. Physics Soc., 1, 3, page 123 (1956).

0.5 to 5 parts by weight, and preferably 2 to 4 parts by weight, of the polymerizable acid or a salt thereof, based upon the total weight of the binder is used. Mixtures of such polymerizable acids and/or salts thereof can be used in a total amount within such ranges. Examples of polymerizable acids are: the olefinic acids having 3 to 7 or more carbon atoms, such as, acrylic acid, β-methacrylic acid, crotonic acid, methacrylic acid, isocrotonic acid, vinylacetic acid, β-pentenoic acid, allylacetic acid, angelic acid, tiglic acid, and isohydrosorbic acid; unsaturated diabasic (dicarboxylic) acids having 4 to 8 or more carbon atoms, such as, maleic acid, fumaric acid, citraconic acid, mesaconic acid, itaconic acid, methylmaleic acid, methyl itaconic acid and glutaconic acid. Anhydrides of such polymerizable acids, such as, crotonic anhydride, methacrylic anhydride, itaconic anhydride, citraconic anhydride and maleic anhydride can be used. Salts of such polymerizable acids can be, for example; amides, such as, acrylamide crotonamide and methacrylic amide; halides such as, acrylyl chloride, crotonyl chloride, tiglyl chloride, fumaryl chloride and itaconyl chloride; and nitriles, such as, crotononitrile, methacrylonitrile acrylonitrile, allylacetonitrile fumaronitrile. Semiesters of such polymerizable acids having 1 to 18 carbon atoms in the ester radical) can be used, and examples of such semiester groups are methyl, ethyl, pentyl, nonyl, isopropyl, decyl, t.-butyl, octadecyl and isobutyl. Mixtures of the above can be used.

The polymerizable acids can be partially neutralized (prior to addition to the reaction mixture) by means of a water soluble tertiary amine. Examples of such tertiary amines are the water soluble trialkyl amine (having 1 to 8 carbon atoms in each alkyl group), such as, tri-n-butylamine, trimethylamine, triethyl amine, and tri propylamine; and the water soluble trialkanol amines (having 1 to 8 carbon atoms), such as, triethanolamine and trisopropanolamine. Mixtures of the tertiary amines can be used.

2 to 35 parts by weight, and preferably 10 to 25 parts by weight, of the reactive monomer, based on the total weight of the binder, is used. Examples of the reactive monomers are: (i) monomers having at least one hydroxyl groups, such as, (a) glycol monoacrylate, monopropylene glycol acrylate, glycol monomethacrylate, monopropylene glycol methacrylate, glycol monocrotonate, glycerol methacrylate, glycol monoisocrotonate, monoacrylate, glycol monovinylacetate butendiol-1,3-monoacrylate, butandiol-1,3-monomethacrylate, trimethylene glycol monoacrylate, trimethylene glycol monomethacrylate, the monoacrylate of 1,5-pentandiol and the monoacrylate of 1,3-butandiol (the above are the reaction products of dihydric alcohols having 1 to 8 carbon atoms or of trihydric alcohols having 1 to 8 carbon atoms and olefinic acids having 3 to 8 carbon atoms), and (b) hydroxy maleic acid esters, dihydroxy maleic acid esters and hydroxy fumaric acid esters the ester radicals thereof having 1 to 18 carbon atoms - examples of such ester groups are ethyl, methyl, propyl, isopropyl, isobutyl, hexyl, nonyl, octyl, tridecyl and pentyl (the above are esters of unsaturated dibasic acids having 4 to 8 carbon atoms in the acid group); (ii) chloro hydroxy ester unsaturated acids, such as, 3-(1-chloro-2-hydroxy)-propylacrylate 3-(1-chloro-2-hydroxypropyl)-isopropylmaleinate; (iii) monomers with functional amide groups, such as, acrylic amide, maleic acid monureide, and with methylolized amide groups, such as, N-methylol methacrylic amide, or their disguised methylol derivatives, such as, n-butoxymethyleneacrylic amide; (iv) monomers with functional allyl groupings such as methacrylic acid allyl ester, maleic acid diallyl ester; and (v) monomers with functional aziridinyl groupings, such as, 1(1-aziridinyl)ethyl-methacrylate.

The viscosity of the lattices usable as binders for coatings can be adjusted subsequently (after production) with various thickening agents. Colloids such as, polyvinyl alcohol and water soluble modifications thereof, water soluble cellulose derivatives, such as hydroxy, ethyl, hydropropyl, methyl, ethyl and carboxymethyl cellulose, water soluble polysaccharides and derivatives thereof and polyacrylic acid and water soluble derivatives of it are usable as the thickening agent.

The dispersions obtained after the polymerization are adjusted with a water soluble tertiary amine (such as, triethylamine, dimethylaminoethanol, triethanol amine or any of the above described water soluble tertiary amines) to a pH between 5 and 9, and preferably a pH of 6. The dispersions are then aged in order to improve their capability to be pigmented and their storage stability by an approximate 10 minute heating to 50° to 60° C.

The aqueous dispersion products of this invention can be pigmented without any further addition of auxiliary dispersing agents. Whenever pigments are used, the ratio of pigments to the other solid substances of the coating can be varied within a wide range depending on the pigment used and the special type of application. Thus the ratio of pigment to the other solid substances of the coating can be from 1:20 to 20:1. The clear coatings are particularly valuable as cover coatings which are used to protect decorative first coatings without impairing the decorative effect. Since the coatings according to this invention are entirely clear and transparent, are hard as well as tough, have a high luster, have excellent resistivity against solvents and water, and have a high degree of adhesiveness to a large number of surfaces, they are superbly suitable as overprint finishes.

The self-cross-linking lacquers to this invention can be applied to a large number of substrata with the single restraint that the substrata be able to resist the hardening process which is essential for the production of the coatings. Metals, such as, iron, steel, chrome-plated steel, tin-plated steel, aluminum, copper, bronze and brass in the form of sheet metal or in a rolled up form, are excellent substrate for the coating compounds according to this invention. Ceramic surfaces, and in a few cases wooden surfaces, are also suitable as substrata.

Once applied, the self-cross-linking lacquers are hardened by a heat treatment which is typically a baking for 2 minutes at 180° to 260° C. - the heat treatment having a time and temperature that varies to the degree needed for each specific self-cross-linking lacquer.

For use in the lacquers of this invention, a multiplicity of pigments can be used. Examples of suitable pigments are titanium dioxide, iron oxide, chromium oxide, cadmium oxide, gypsum, calcium silicate, quartz powder, talcum, soot, calcium carbonate, baryte and organic pigments such as Printasol dyes®. Organic and/or inorganic pigments and/or extenders can be used.

The coating compounds can be applied by any suitable means or device, such as, with spray gun, brushes or rollers, or by submerging and surprisingly by directly rolling to it, that is to say a single roller applies the coating to the substratum, whereby it rotates in a bath of the coating compound. The applied coating can be hardened in each case by direct heat action into a smooth film.

The resulting cured lacquers of this invention excel by means of their high luster, good chemical resistance, special toughness and hardness as well as by their excellent pigment compatibility and pigment distribution. These good characteristics come about through the fact, that according to the process of this invention, very finely distributed dispersions, so-called hydrosoles, are achieved.

Herein the term self-cross-linking means that only the application of heat is needed to cross-link the lacquer.

By way of summary this invention utilizes a binder consisting essentially of:

a. 30 to 70 parts by weight of a monomer or of a monomer mixture, whereby the theoretical glass temperatures of the homopolymer lies below 10° C,
b. 30 to 70 parts by weight of a monomer or of a monomer mixture, whereby the theoretical glass temperatures of the homopolymer lie above 30° C,
c. 0.5 to 5 parts by weight of a polymerizable acid or its salts,
d. 2 to 35 parts by weight of a reactive monomer, and
e. 0.5 to 5 parts by weight of an alkali or ammonium salt of a polymerizable sulfonic acid.

In this specification, including the examples and claims, percentages, parts, ratios and proportions are on a weight basis, unless otherwise stated or obvious to one ordinarily skilled in the art.

GENERAL POLYMERIZATION PROCESS

The appropriate portion of the monomer mixture is inserted into an agitator autoclave having heating and cooling means as well as means for adding doses (can be on a batch, semi-continuous or continuous basis) of further materials. Then a portion of the aqueous phase, in which the emulsifiers and the persulfate are dissolved in, is inserted into the autoclave. After flushing the autoclave with nitrogen, a certain amount of the monomer mixture is pre-emulsified, the temperature is adjusted to the desired temperature (20° to 23° C), and the polymerization is started by dosing in (adding on a continuous basis) an aqueous solution of ascorbic acid and iron (II)-salt. At the same time a sudden temperature rises of 1° to 2° C. will be observed, whereupon the dosing speed of the reduction agent is throttled. At the same time, the feed of the remaining monomers (which are being dosed in) can be balanced with the dosing speed of the reduction agent while making use of the cooling capacity of the reaction vessel in order to maintain the pre-selected constant polymerization temperature ($\pm$ 1° C).

Polymerizable components which are not monomer-soluble, for example, certain acids, reactive monomers and/or emulsifiers, are added by doses in aqueous solution concurrently with and parallel to the addition remaining monomer mixture. The polymerizable acids can be partially neutralized prior to addition with a water soluble tertiary amine.

If the introduction of the reactive methylol grouping is accomplished in situ, then the quantity of formaldehyde required for this purpose is placed in the autoclave the aqueous phase as such is being prepared and the monomer amide in question is dosed as needed.

EXAMPLE 1

Using the general polymerization process, the following starting mixture was polymerized in a 2-liter agitator autoclave:

| | |
|---|---|
| 1. mixture; | |
| de-ionized water | 410 gm. |
| Fenopon CO-436® (50%) | 5 gm. |
| methallyl sulfonate (sodium salt) | 1 gm. |
| potassium persulfate (KPS) | 0.8 gm. |
| 2. dosing materials | |
| 2.1 aqueous solution: | |
| de-ionized water | 100 gm. |
| acrylic acid (adjusted with triethylamine to pH 3) | 8 gm. |
| N-methylolacrylic amide | 32 gm. |
| methallyl sulfonate | 0.5 gm. |
| 2.2 monomer phase: | |
| ethylacrylate (of these 20 gm. are initially placed in the autoclave) | 160 gm. |
| styrene | 122 gm. |
| 2.3 activator solution: | |
| de-ionized water | 50 gm. |
| ascorbic acid | 0.3 gm. |
| iron (II)-sulfate ($FeSO_4 \cdot 7H_2O$) 0.05M aqueous solution | 0.5 gm. |
| Fenopon CO-436® | |
| polymerization temperature | 27° C. |
| duration of reaction (= duration of supply of the monomers) | 4 hrs. |
| pH adjusted with triethylamine to 6 | |

A series of additional experiments (i.e., Examples 1a to 5) was carried out according to Example 1, except that the composition and the reaction conditions were varied according to Table 1.

In page B of Table 1, characteristics of the dispersions obtained are listed. The conversion in each case were more than 99.5 percent. The content of solid substance was between 35 and 40 percent.

Table 2 shows the technical characteristics and properties of the lacquers of the pigmented baked films.

EXAMPLE 2

This experiment was carried out in a 5-liter agitator autoclave and at the same time five times the quantity of the original mixture in Example 1a was polymerized. The initiator quantity used was reduced to about one half.

EXAMPLE 3

As compared to Example 1a the ratio of styrene to ethylacrylate was increased and an additional emulsifier was also used in the initial mixture.

EXAMPLE 4

The formaldehyde was inserted in situ into the acrylic amide and maleic acid monoureide. The dosed portion of methallyl sulfonate was increased.

EXAMPLE 5

The emulsifier mixture corresponded to Example 3. As compared to Example 1a polypropyleneglycol-monoacrylate was used as an additional cross-linking component, and the addition of formaldehyde to the acrylic amides was done as in Example 4. The dosed portion of methallyl sulfonate corresponded to that of Example 4.

TABLE 1
(Examples 1a–5)

| | | Example No. | | | | |
|---|---|---|---|---|---|---|
| | | 1a | 2 | 3 | 4 | 5 |
| A.1. | Mixture: | | | | | |
| | de-ionized water | 127.5 | 120.5 | 123.9 | 107.7 | 106.3 |
| | Fenopon CO-436® | 0.77 | 0.73 | 0.75 | 0.69 | 0.67 |
| | Tensopol A | | | 0.75 | | 0.67 |
| | methallylsulfonate | 0.31 | 0.29 | 0.3 | 0.28 | 0.27 |
| | KPS | 0.25 | 0.15 | 0.24 | 0.22 | 0.22 |
| | formaldehyde (100%) | | | | 4.14 | 5.15 |
| 2. | dosing | | | | | |
| 2.1 | aqueous phase: | | | | | |
| | de-ionized water | 30.9 | 30.7 | 29.9 | 27.6 | 27.0 |
| | acrylic acid (pH adjusted) | 2.47 | 2.48 | 2.40 | 4.14 | 4.05 |
| | N-methylolacrylic amide | 9.89 | 9.46 | 9.73 | | |
| | acrylic amide | | | | 8.5 | 8.38 |
| | maleic acid monoureide | | | | 2.76 | |
| | Methallylsulfonate | 0.15 | 0.15 | 0.15 | 0.55 | 0.54 |
| 2.2 | monomer phase: | | | | | |
| | ethylacrylate | 49.5 | 49.7 | 40.5 | 47 | 44.6 |
| | styrene | 37.7 | 37.9 | 46.8 | 35.9 | 34.0 |
| | polypropyleneglycolmono-acrylate | | | | | 8.1 |
| 2.3 | activator solution: | | | | | |
| | de-ionized water | 15.5 | 14.6 | 15.0 | 13.8 | 13.5 |
| | ascorbic acid | 0.09 | 0.04 | 0.09 | 0.08 | 0.08 |
| | iron (II) sulfate ($FeSO_4 \cdot 7H_2O$) 0.05 M aqueous solution | 0.15 | 0.08 | 0.15 | 0.15 | 0.15 |
| | Fenopon CO-436® | 0.03 | 0.03 | 0.03 | 0.03 | 0.03 |
| | polymerization temperature (° C) | 27 | 27 | 27 | 21 | 21 |
| | reaction duration (=duration of supply of the monomers) (hrs.) | 4 | 4 | 3 | 4 | 2½ |
| B | solid matter (%) | 36.3 | 35.4 | 36.8 | 39.4 | 39.8 |
| | monomer residue (%related to dispersion) | 0.35 | 0.19 | 0.30 | 0.28 | 0.22 |
| | viscosity Din-4-beaker (sec) | 28.6 | 21 | 19.2 | 17 | 16.8 |

TABLE 1-continued
(Examples 1a-5)

| | Example No. | | | | |
|---|---|---|---|---|---|
| | 1a | 2 | 3 | 4 | 5 |
| pH | 6 | 6 | 6 | 6 | 6 |

Note: All numbers in Table 1 are amounts expressed in grams unless otherwise stated.

The dispersions produced according to Examples 1a to 5 were each grounded in a ball mill with titanium dioxide (rutile) in a ratio of 1:1, related to the content of the dispersion of solid substances.

The pigmented backing varnish were applied with an 80 spindle as films on chromatized aluminum (0.6 mm thickness) and then baked for 2 minutes at 180° to 260° C. Highly lustrous lacquer coatings without blisters were obtained each having excellent levelling and very good lacquer-technical characteristics (properties).

Table 2

| | | | | | | | Constancy of solution | |
|---|---|---|---|---|---|---|---|---|
| | Baking temp., °C | Thickness of layer μ | Pendulum hardness acc. to Koenig, sec. | Luster % | Lattice cut | T bend | acetone, 3 min. | glacial acetic acid 1 min. |
| Example 1a | 240 | 20–21 | 150 | 94 | 0 | 2 | good | good |
| Example 2 | 260 | 21–23 | 160 | 88 | 0 | 6 | good | good |
| | 240 | 20–21 | 149 | 89 | 1 | 3 | good | good |
| | 200 | 20–22 | 135 | 88 | 1 | 3 | satisfact. | satisfact. |
| | 180 | 20–23 | 128 | 90 | 1 | 5 | satisfact. | satisfact. |
| Example 2 with 5%, related to dispersion, melamine resin additive | 180 | 20–21 | 151 | 90 | 0 | 3 | good | good |
| Example 3 | 240 | 21–23 | 165 | 97 | 0 | 2 | good | good |
| Example 4 | 240 | 22–24 | 142 | 97 | 1 | 2 | good to very good | good to very good |
| Example 5 | 240 | 22–24 | 148 | 97 | 0 | 3 | good to very good | good to very good |

What is claimed is:

1. The process for preparing a lacquer utilizing an aqueous dispersion, the lacquer being pigmented or non-pigmented, being self-cross linking upon heat treatment and containing a binder consisting essentially of the copolymer obtained from the copolymerization of the following monomers:
   a. 30 to 70 parts by weight, based on the total weight of the binder, of at least one monomer whose homopolymer has a theoretical glass temperature of less than 10° C.,
   b. 30 to 70 parts by weight, based on the total weight of the binder, of at least one monomer whose homopolymer has a theoretical glass temperature of more than 30° C.,
   c. 0.5 to 5 parts by weight, based on the total weight of the binder, of at least one polymerizable acid or anhydride thereof or a compound thereof which is an amide, halide, nitrile or semiester thereof, said polymerizable acid being an olefinic acid having 3 to 7 or more carbon atoms, an unsaturated dibasic acid having 4 to 8 or more carbon atoms,
   d. 2 to 35 parts by weight, based on the total weight of the binder, of at least one reactive monomer, said reactive monomer being a monomer having at least one hydroxyl group and which is the reaction product of a dihydric alcohol having 1 to 8 carbon atoms or of a trihydric alcohol having 1 to 8 carbon atoms and an olefinic acid having 3 to 8 carbon atoms, a monomer having at least one hydroxyl group and which is the ester of an unsaturated dibasic acid having 4 to 8 carbon atoms in the acid group, a chlorohydroxy ester of an unsaturated acid, a monomer having a functional amide group or groups, a monomer having a methylolized amide group, n-butoxymethyleneacrylic amide, a monomer with a functional allyl grouping or groups or a monomer having a functional aziridinyl grouping or groups,
   e. 0.5 to 35 parts by weight, based on the total weight of the binder, of at least one alkali metal or ammonium salt of a polymerizable sulfonic acid compound, which comprises conducting the polymerization in an aqueous dispersion in a reaction vessel at a preselected temperature between 15° and 30° C. and at a starting pH of 3 to 4 in the presence of a redox system consisting of 0.005 to 0.5 percent by weight, based on the total weight of the monomers, of at least one alkali metal and/or ammonium persulfate, 0.001 to 0.5 percent by weight ascorbic acid, based upon the total weight of the monomers, and 10 to 30 p.p.m., of at least one iron (II)-salt, no more than 30 percent of the monomers and the majority of the persulfate being inserted into the reaction vessel before the polymerization step itself starts, after the polymerization step itself starts, dosing in the remaining amount of monomers concurrently and parallel with the iron (II)-salt and the ascorbic acid in such a manner that the preselected polymerization temperature remains almost constant.

2. The process of claim 1 wherein the polymerization temperature is between 20° and 23° C.

3. The process of claim 1 wherein the alkali metal persulfate is potassium persulfate.

4. The process of claim 1 wherein 0.05 to 0.2 percent of the alkali metal and/or ammonium persulfate is used.

5. The process of claim 1 wherein between 0.01 and 0.2 percent of ascorbic acid is used.

6. The process of claim 1 wherein between 10 and 20 p.p.m. of the iron(II)-salt is used.

7. The process of claim 1 wherein the iron (II)-salt is ferrous sulphate.

8. The process of claim 1 wherein the iron(II)-salt is an iron compound or complex which releases iron(II)-ions under the polymerized condition.

9. The process of claim 1 wherein the starting pH is 3.5.

10. The process of claim 1 wherein the pH is adjusted to the stated starting pH level by means of an organic acid.

11. The process of claim 1 wherein the pH is adjusted to the stated starting pH level by means of said polymerizable acid.

12. The process of claim 1 wherein, after polymerization has been completed, 1 to 15 percent by weight, based on the aqueous dispersion, of a water soluble melamine or urea resin in added to the dispersion.

13. The process of claim 1 wherein 40 to 60 parts by weight of the monomer whose homopolymer has a theoretical glass temperature of less than 10° C. is used.

14. The process of claim 13 wherein monomer (a) is a vinyl ester having 3 to 20 carbon atoms in the acid radical and the acid radical has a branched carbon chain.

15. The process of claim 1 wherein 40 to 60 parts by weight of monomer(c) is used.

16. The process of claim 1 wherein said monomer (b) has a homopolymer which has a glass theoretical temperature of 30° to 150° C.

17. The process of claim 1 wherein 10 to 20 parts by weight of reactive monomer (d) is used.

18. The process of claim 1 wherein 1 to 3 parts by weight of the alkali metal and/or ammonium salt of the polymerizable sulfonic acid compound is used.

19. The process of claim 1 where 2 to 4 parts by weight of the polymerizable acid or compound thereof is used.

20. The process of claim 1 wherein 10 to 25 parts by weight of reactive monomer (d) is used.

21. The process of claim 1 wherein the polymerization speed is controlled by way of the dosing of the reducing initiator components in such a way that a constant polymerization temperature is maintained.

22. The process of claim 1 wherein the pH is adjusted to 5 to 9 after the polymerization step and aqueous dispersion is heated at an increased temperature below the baking temperature for about 10 minutes to age the self-cross-linking lacquer.

23. The process of claim 1 wherein 1 to 15 percent by weight, based on the dispersion, of a water soluble melamine or urea resin is added to the aqueous dispersion after the polymerization step.

24. The process of claim 1 wherein, after the polymerization step, the self-cross-linking lacquer, in the form of an aqueous dispersion, is applied to the surface of a substrate and heat treated or baked to cross-link the lacquer.

25. The process of claim 1 wherein said polymerizable acid or anhydride thereof, is acrylic acid, β-methacrylic acid, crotonic acid, methacrylic acid, isocrotonic acid, vinylacetic acid, β-pentenoic acid, allylacetic acid, angelic acid, tiglic acid, isohydrosorbic acid, maleic acid, fumaric acid, citraconic acid, mesaconic acid, itaconic acid, methylmaleic acid, methylitaconic acid, glutaconic acid, crotonic anhydride, methacrylic anhydride, itaconic anhydride, citaconic anhydride or maleic anhydride.

26. The process of claim 1 wherein said compound of said polymerizable acid is an amide of said polymerizable acid, a halide of said polymerizable acid, a nitrile of said polymerizable acid or a semiester of said polymerizable acid having 1 to 18 carbon atoms in the ester moiety.

27. The process of claim 1 wherein said ester moiety of said semiester is methyl, ethyl, pentyl, nonyl, isopropyl, decyl, t.-butyl, octadecyl or isobutyl.

28. The process of claim 1 wherein said compound of said polymerizable acid is acrylamide crotonamide, methacrylic amide, acryl chloride, crotonyl chloride, tiglyl chloride, fumaryl chloride, itaconyl chloride, crotononitrile, methacrylonitrile, acrylonitrile, allylacetonitrile or fumaronitrile.

29. The process of claim 1 wherein said polymerizable acid is partially neutralized prior to addition to the reaction mixture by means of a water soluble tertiary amine.

30. The process of claim 29 wherein said water soluble tertiary amine is a water soluble trialkyl amine having 1 to 8 carbon atoms in each alkyl group, or a water soluble trialkanol amine having 1 to 8 carbon atoms.

31. The process of claim 29 wherein said water soluble tertiary amine is tri-n-butylamine, trimethylamine, triethyl amine, tripropylamine, triethanolamine or tri-isopropanolamine.

32. The process of claim 1 wherein said reactive monomer is ethylene glycol monoacrylate, monopropylene glycol acrylate, ethylene glycol monomethacrylate, monopropylene glycol methacrylate, ethylene glycol monocrotonate, ethylene glycerol methacrylate, ethylene glycol monoisocrotonate, butanidiol-1,3-monomethacrylate, trimethylene glycol monoacrylate, trimethylene glycol monomethacrylate, the monoacrylate of 1,5-pentandiol, the monoacrylate of 1,3-butandiol, ethyl, methyl, propyl, isopropyl, isobutyl, hexyl, nonyl, octyl, tridecyl and pentyl esters of hydroxy maleic acid, dihydroxy maleic acid or hydroxy fumaric acid, 3-(1-chloro-2-hydroxy)-propylacrylate, 3-(1-chloro-2-hydroxypropyl)-isopropylmaleinate, acrylic amide, maleic acid monureide, n-butoxymethyleneacrylic amide, methacrylic acid allyl ester, maleic acid diallyl ester or 2-(1-aciridinyl) ethyl-methacrylate.

33. The process of claim 1 wherein said emulsifier is an anionic emulsifier.

34. The process of claim 33 wherein said anionic emulsifier is an alkyl sulfate, a sulfate of an alkyl or an alkylarylpolyethoxy alkanol, an alkyl sulfonate, an alkylaryl sulfonate or an ester of sulfosuccinic acid with an alkanol.

* * * * *